US010823506B2

(12) United States Patent
Mahowald et al.

(10) Patent No.: US 10,823,506 B2
(45) Date of Patent: Nov. 3, 2020

(54) INSTALLATION FOR DISTRIBUTING PULVERULENT SUBSTANCE BY PNEUMATIC TRANSPORTATION, COMPRISING A DEVICE FOR DEPRESSURIZING A PRESSURIZED RESERVOIR IN WHICH SAID SUBSTANCE IS STORED

(71) Applicant: PAUL WURTH S.A., Luxembourg (LU)

(72) Inventors: Pierre Mahowald, Mamer (LU); Ben Muller, Strassen (LU); Louis Schmit, Luxembourg (LU)

(73) Assignee: PAUL WURTH S.A., Luxembourg (LU)

( * ) Notice: Subject to any disclaimer, the term of this patent is extended or adjusted under 35 U.S.C. 154(b) by 319 days.

(21) Appl. No.: 14/413,127

(22) PCT Filed: Jul. 3, 2013

(86) PCT No.: PCT/EP2013/063992
§ 371 (c)(1),
(2) Date: Jan. 6, 2015

(87) PCT Pub. No.: WO2014/006073
PCT Pub. Date: Jan. 9, 2014

(65) Prior Publication Data
US 2015/0204610 A1    Jul. 23, 2015

(30) Foreign Application Priority Data
Jul. 6, 2012   (LU) .......................................... 92037

(51) Int. Cl.
*F27D 3/10*      (2006.01)
*B65G 53/12*     (2006.01)
(Continued)

(52) U.S. Cl.
CPC ............... *F27D 3/10* (2013.01); *B65G 53/12* (2013.01); *B65G 53/22* (2013.01); *F27B 1/20* (2013.01);
(Continued)

(58) Field of Classification Search
CPC .................................. F27D 3/0033; F27D 3/10
See application file for complete search history.

(56) References Cited

U.S. PATENT DOCUMENTS 914,830  A  *  3/1909  Harper, Jr. .............. C21B 5/003
                                                         266/182
1,567,642 A  *  12/1925  Harrison ................. C21B 5/003
                                                         266/140
(Continued)

FOREIGN PATENT DOCUMENTS

CN       201158550 Y    12/2008
EP       0079444 A1     5/1983
(Continued)

OTHER PUBLICATIONS

International Search Report dated Aug. 5, 2013 re: Application No. PCT/EP2013/063992; citing: JP 58 011421 A and JP 63 001631 A.
(Continued)

*Primary Examiner* — Patrick J Maestri
*Assistant Examiner* — Joseph J. Sadlon
(74) *Attorney, Agent, or Firm* — Cantor Colburn LLP

(57) ABSTRACT

An installation for distribution of granular or powder material via pneumatic transport comprising at least one dispensing hopper (3) for temporary storage of said granular or powder material, the dispensing hopper being suited to being, alternately, pressurized for emptying the dispensing hopper and depressurized to permit filling thereof, and a device for depressurizing said dispensing hopper. The depressurizing device comprises a depressurizing duct (12)
(Continued)

connected to said dispensing hopper, a bag filter (11), having a maximum operating flow rate, connected to the depressurizing duct, and flow control means (15) for controlling the flow rate in said depressurizing duct through the bag filter. The bag filter (11) is suited to operating under pressure, and the flow control means (15) are located on the depressurizing duct (12) downstream of the bag filter (11) and are arranged to provide a flow rate which is at most equal to the maximum flow rate of the bag filter. Application in particular to an installation for injecting coal into a blast furnace.

13 Claims, 2 Drawing Sheets

(51) Int. Cl.
| | |
|---|---|
| *F27D 3/00* | (2006.01) |
| *F27D 3/18* | (2006.01) |
| *F27B 1/20* | (2006.01) |
| *F27D 19/00* | (2006.01) |
| *F27B 1/26* | (2006.01) |
| *B65G 53/22* | (2006.01) |

(52) U.S. Cl.
CPC .............. *F27B 1/26* (2013.01); *F27D 3/0033* (2013.01); *F27D 3/18* (2013.01); *F27D 19/00* (2013.01); *F27D 2003/185* (2013.01); *F27D 2019/004* (2013.01); *F27D 2019/0068* (2013.01)

(56) References Cited

U.S. PATENT DOCUMENTS

| | | | | | |
|---|---|---|---|---|---|
| 2,195,866 | A * | 4/1940 | Le Clarick | .............. | C21B 5/003 137/340 |
| 2,707,132 | A * | 4/1955 | Baresch | ................. | B65G 53/12 406/132 |
| 2,740,671 | A * | 4/1956 | Sayre | ..................... | B65G 53/20 406/89 |
| 2,992,858 | A * | 7/1961 | Pendleton | ................ | B01J 4/001 406/168 |
| 3,224,812 | A * | 12/1965 | Bozich | ..................... | A01K 5/02 406/1 |
| 3,460,934 | A * | 8/1969 | Kelmar | ................... | C21B 5/003 75/459 |
| 3,504,945 | A * | 4/1970 | Leibundgut | ........... | B05B 7/1404 406/127 |
| 3,746,254 | A * | 7/1973 | Duncan | ................... | B05B 5/032 239/697 |
| 3,858,943 | A * | 1/1975 | Bose | ...................... | B65G 53/12 222/373 |
| 4,019,783 | A * | 4/1977 | Kayser | ................... | B65G 53/14 406/130 |
| 4,049,247 | A * | 9/1977 | Stamer | ............... | B65G 53/4633 266/182 |
| 4,108,500 | A * | 8/1978 | Stamer | ................... | B65G 53/12 222/373 |
| 4,149,755 | A * | 4/1979 | Handleman | ............ | B65D 88/72 137/527.8 |
| 4,395,023 | A * | 7/1983 | Tomizawa | ............ | C21C 5/5294 266/142 |
| 4,395,166 | A * | 7/1983 | Ulveling | ................. | C21B 5/003 266/187 |
| 4,548,529 | A * | 10/1985 | van der Burgt | ........... | B01J 3/02 406/124 |
| H109 | H * | 8/1986 | Gardner | ........................ | 239/129 |
| 4,815,414 | A * | 3/1989 | Duffy | .................... | B05B 7/1477 118/308 |
| 4,883,390 | A * | 11/1989 | Reintjes | .................. | B65G 53/12 406/124 |
| 5,071,289 | A * | 12/1991 | Spivak | .................... | B65G 53/22 406/11 |
| 5,453,471 | A * | 9/1995 | Bernier | ................... | B01J 8/1827 526/335 |
| 5,489,166 | A * | 2/1996 | Schmit | ..................... | B01J 8/003 34/360 |
| 5,516,356 | A * | 5/1996 | Schmit | .................... | B01F 3/188 266/83 |
| 5,727,541 | A * | 3/1998 | Rowland | ................ | A61M 11/06 128/200.14 |
| 5,752,788 | A * | 5/1998 | Crum | .................... | B05B 7/1422 406/109 |
| 6,287,056 | B1 * | 9/2001 | Szikszay | ................ | B65G 53/12 406/127 |
| 6,676,731 | B1 * | 1/2004 | Deppe | ........................ | B01J 3/02 75/414 |
| 7,488,141 | B2 * | 2/2009 | Bivens | ............. | B01F 15/00123 406/93 |
| 7,634,937 | B2 * | 12/2009 | Burdett | .................. | B01J 8/1809 422/68.1 |
| 7,678,176 | B2 * | 3/2010 | Whitten | ................ | C21B 13/143 266/200 |
| 7,976,627 | B2 * | 7/2011 | Westmattelmann | ........................ | B01F 15/0408 106/739 |
| 8,491,228 | B2 * | 7/2013 | Snowdon | ............... | B01J 8/0025 406/14 |
| 8,899,884 | B2 * | 12/2014 | Kretschmer | ............. | C10J 3/503 406/10 |
| 9,573,775 | B2 * | 2/2017 | Shimono | ................ | C21B 5/003 |

FOREIGN PATENT DOCUMENTS

| | | |
|---|---|---|
| EP | 0212296 A2 | 3/1987 |
| JP | 58011421 A | 1/1983 |
| JP | 63001631 A | 1/1988 |

OTHER PUBLICATIONS

International Preliminary Report on Patentability dated Feb. 11, 2015 re: PCT/EP2013/063992; citing: JP 58 011421 A and JP 63 001631 A.
English Translation of Examination Report for Taiwan Application No. 102123911 dated Jul. 25, 2016.

\* cited by examiner

INSTALLATION FOR DISTRIBUTING PULVERULENT SUBSTANCE BY PNEUMATIC TRANSPORTATION, COMPRISING A DEVICE FOR DEPRESSURIZING A PRESSURIZED RESERVOIR IN WHICH SAID SUBSTANCE IS STORED

FIELD OF THE INVENTION

The present invention relates to an installation for distribution of granular or powder material via pneumatic transport, such as for example an installation for injecting coal into a blast furnace, comprising at least one dispensing hopper for temporary storage of said granular or powder material. The dispensing hoppers are pressurized for emptying and they must be depressurized to permit filling thereof.

The invention relates more particularly to the means enabling depressurization of the dispensing hopper prior to filling thereof.

BACKGROUND OF THE INVENTION

It is well-known, for example from EP 0 079 444 or EP 0 212 296 to inject granular or powder materials, in particular powdered coal, into a blast furnace. These materials are conventionally transported pneumatically. Typically, in a blast furnace, powdered coal may be injected at the level of each tuyere or at least into a plurality of tuyeres. Such a transport and injection installation is shown in FIG. 1 where, in order to simplify the drawing, a single dispensing line towards the tuyeres has been shown, it being understood that there may be a plurality of these lines connected downstream of a single main storage hopper 1. The coal is supplied from the main storage hopper 1, which is maintained at atmospheric pressure, and distributed towards each injection point via a pneumatic dispensing line 2 which, in the vicinity of the blast furnace, divides into a plurality of injection lines, each connected to an injection point. The coal may also be transported via the dispensing line towards another vessel maintained under constant pressure, then known as "injection hopper", located in the vicinity of the blast furnace. The injection lines are then connected to said injection hopper. Transport and injection installations conventionally comprise pressurized temporary storage vessels, or dispensing hoppers, which are suited to containing said material and are pressurized by a transport gas, for example nitrogen. This gas makes it possible to fluidize the powder material and to transport it to its point of use, conventionally located in the tuyere.

It is already known to control the total flow rate of coal sent towards the blast furnace by measuring flow rate and a control valve, while the individual streams towards the various tuyeres are not controlled, even if various measures are put in place to ensure uniform distribution among all the tuyeres. There are also installations in which the overall flow rate together with the individual flow rates are controlled.

Transport and injection installations are intended, on the one hand, to enable control of the flow rate of injected material and, on the other hand, a continuous supply of powder material. To this end, as shown in FIG. 1, a set of at least two dispensing hoppers 3 located in parallel in the transport line and provided with closing valves 4, 5 enabling control of filling and emptying of each hopper is conventionally used for each transport line. Said dispensing hoppers 3 are used alternately, with one being emptied for supplying coal to the blast furnace tuyere, while the other one is being filled from the main storage hopper. Furthermore, each dispensing hopper is provided with a weighing means 6 which makes it possible to determine the quantity of powdered coal introduced on each filling, so enabling control of the quantity of coal injected.

When filling a dispensing hopper from the main hopper, in order to avoid excess pressure which could prevent the coal from flowing well, the gas present in the dispensing hopper is discharged towards the upper part of the main hopper by a pressure-equalizing duct equipped with an isolation valve 16 which is open during said filling. Since said duct is closed by the valve 16 once filling of the dispensing hopper is complete, it therefore remains filled with moist gas containing powdered coal. In order to avoid the risks of condensation and clogging of the coal, or even blockage of the line, which may arise, these ducts are insulated and heated.

In order to empty each dispensing hopper via pneumatic transport of the powdered coal, these hoppers are supplied with pressurized gas via a duct equipped with a valve 7 which makes it possible to maintain the pressure required for transport during the entire duration of emptying. These dispensing hoppers, which are maintained under pressure when in use, must therefore periodically be depressurized each time before being refilled from the main storage hopper. The gas escaping from the hopper during depressurization inevitably entrains some powder product still present in said hopper. Bag filters are conventionally used in order to avoid discharging significant quantities of powdered coal into the atmosphere together with the pressurized gas during depressurization. Typically, each dispensing hopper is connected via a depressurizing duct equipped with a valve 8 to a bag filter 9 located on the main storage hopper 1, which makes it possible to recover the powdered coal retained by the bag filter directly into said main hopper, the gas being discharged, in accordance with the arrow F, into the atmosphere or recovered elsewhere. Since the main hopper is at atmospheric pressure, the filter too is therefore also under atmospheric pressure, the drop in pressure arising from the loss of load between the dispensing hopper 3 and the bag filter 9 and being controllable by the depressurizing valve 8 located on the duct connecting said hopper and filter.

During depressurization, the pressure in the dispensing hopper declines gradually. Furthermore, the bag filters permit a maximum volumetric flow rate which is determined by the area of the filter's filtration surface. In order to optimize depressurization, it is therefore desired to maintain a maximally constant volumetric flow rate through the filter throughout depressurization, which makes it possible to minimize the necessary filtration surface and hence the overall size of the filters and the cost thereof. The flow rate control provided by the valve 8 located on the duct between the dispensing hopper 3 and the bag filter 9 makes it possible to ensure the desired constancy of flow rate.

One drawback of these systems resides in the fact that said control valve 8 therefore necessarily acts on gas streams laden with powder material. Another drawback arises from the fact that, in a typical blast furnace installation, a plurality of injection lines each comprising two, or even three, metering hoppers are connected to a single low pressure bag filter and, consequently, variations in pressure in a duct connecting a dispensing hopper to the filter during depressurization may have a disruptive effect on the weighing equipment of the other dispensing hoppers, and in particular on the dispensing hopper currently carrying out injection.

Another drawback arises from the fact that, during depressurization, a certain quantity of powdered coal is returned with the depressurization gas stream towards the bag filter and then onwards towards the main storage hopper. It is not possible to determine this quantity with precision. As a result, not only is the true quantity of coal injected into the tuyeres less than the quantity detected by the dispensing hopper weighing operations, but said quantity is also not known with precision.

Still another drawback originates from the fact that the duct between the depressurizing valves and the bag filter are relatively long and of large diameter, so resulting in elevated equipment costs.

BRIEF SUMMARY

The invention solves the above-stated problems and to eliminate or at least limit the drawbacks associated with prior art installations.

In the light of these aims, the invention provides an installation for distribution of granular or powder material via pneumatic transport comprising at least one dispensing hopper for temporary storage of said granular or powder material, the dispensing hopper being suited to being, alternately, pressurized for emptying the dispensing hopper and depressurized to permit filling thereof, and a device for depressurizing said dispensing hopper, comprising

- a depressurizing duct connected to said dispensing hopper, and
- a bag filter, having a maximum operating flow rate, connected to the depressurizing duct, i.e. either located in series on said duct or connected directly to the dispensing hopper and upstream of said duct, and
- flow control means for controlling the flow rate in said depressurizing duct through the bag filter.

According to the invention, the installation is characterized in that the bag filter is a filter suited to operating under pressure, and the flow control means are located on the depressurizing duct downstream of the bag filter and arranged to ensure a flow rate which is at most equal to the maximum flow rate of the bag filter.

One advantage is that the flow control means, which are then located downstream of the filter, have a dedusted stream of gas passed through them and are therefore not subject to the risks of abrasion, clogging and reduction in cross-section, and therefore in flow rate, which could consequently arise.

According to one particular arrangement, the installation comprises a main storage hopper and a plurality of dispensing hoppers connected to the main storage hopper in order to be filled periodically with granular or powder material via pneumatic transport from the main hopper, and each dispensing hopper comprises its own depressurizing device, with a pressurized bag filter mounted directly on each dispensing hopper.

In comparison with prior art devices using a bag filter operating under atmospheric pressure mounted on the main storage hopper, the arrangement according to the invention exhibits a number of advantages:

There is no longer any need, between the dispensing hopper and the bag filter, for large diameter depressurizing ducts, typically ND 400, nor for pressure-equalizing ducts, typically of a diameter of ND 200, which, for a typical blast furnace installation, may permit weight savings of the order of 4 tons per dispensing hopper.

Furthermore, there is therefore no longer any risk of the pressure-equalizing ducts becoming blocked, and there is no longer any need to provide thermal insulation for or to monitor the temperature of these ducts.

Since the powdered coal retained by the bag filter for each dispensing hopper is returned directly to said hopper, and not to the main storage hopper, measurement of the true mass of coal injected is no longer distorted.

Depressurization of a dispensing hopper no longer has any effect on the weighing system of another dispensing hopper. This is because, in prior art systems using a bag filter which is located at the top of the main storage hopper and is common to a plurality of dispensing hoppers, all the dispensing hoppers are connected via their respective depressurizing ducts which lead to said filter. Consequently, depressurization of one of the dispensing hoppers has an influence on the weighing systems of the other dispensing hoppers, as a result of the bag filter back-pressure which has an effect on the depressurizing valves of the other dispensing hoppers. This problem is eliminated by using one bag filter per dispensing hopper.

According to a first embodiment, the flow control means comprise a plate with an orifice of predetermined cross-section, suited to permitting the passage of a maximum volumetric flow rate which is less than or equal to the maximum admissible flow rate for the bag filter.

According to another preferred embodiment, the flow control means comprise a de Laval nozzle, of a predetermined cross-section and shape, suited to permitting the passage of a maximum volumetric flow rate which is less than or equal to the maximum admissible flow rate for the bag filter.

Providing that expansion of the mixture of gas and powder product in the orifice or de Laval nozzle remains critical, the latter produce a constant effective volumetric flow rate through the bag filter located upstream, insofar as depressurization proceeds at a substantially constant temperature.

When the pressure at the inlet to the de Laval nozzle, or upstream of the orifice, declines continuously as a result of depressurization of the hopper, the mass flow rate of the mixture of gas and powder product likewise declines proportionally. On the other hand, the volumetric flow rate remains constant independently of the pressure upstream of the de Laval nozzle or the plate orifice, provided that the upstream gas temperature is kept constant.

Substitute Specification, Clean Version

Thus, thanks to the use of static control means without moving elements, such as the plate with an orifice or the de Laval nozzle, there is no longer any need for controlled depressurizing valves as in the prior art, which may result in considerable savings per hopper.

BRIEF DESCRIPTION OF THE DRAWINGS

Other details and characteristics of the invention will emerge from the following description of an embodiment, provided by way of illustration, with reference to the appended drawings, in which.

DESCRIPTION OF A PREFERRED EMBODIMENT

Figure 1:
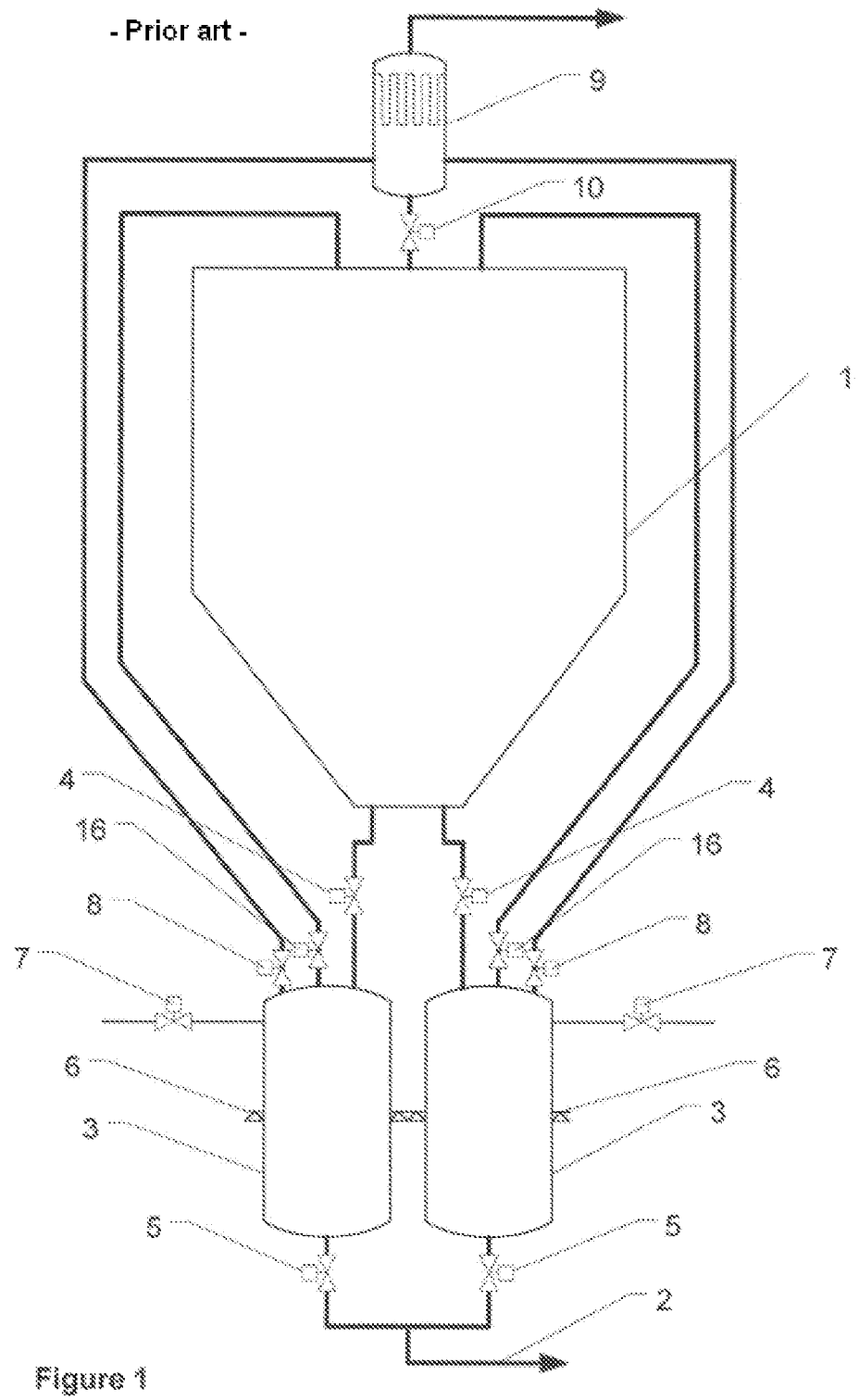
FIG. 1: is a simplified schematic view of a prior art installation for injecting coal into a blast furnace, which has already been described and commented upon in the introductory part of the present specification.
Figure 2A:
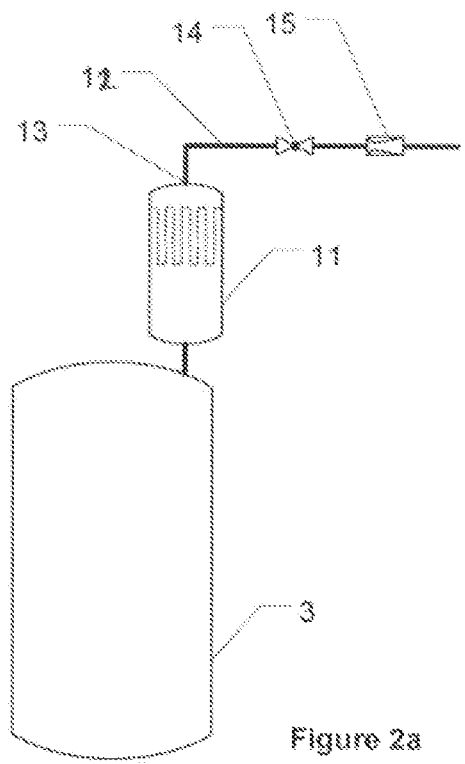
FIG. 2a and FIG. 2b: are simplified schematic views of two variants of a dispensing hopper of a corresponding installation according to the invention.
Figure 2B:
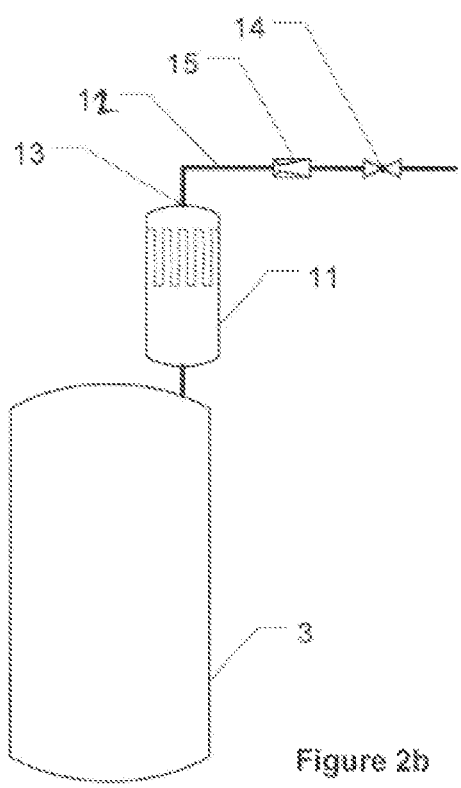

In the device according to the invention shown in FIGS. 2a and 2b, the dispensing hopper 3 is equipped with a bag filter 11 intended to operate under pressure. To this end, the casing of the bag filter will be reinforced to allow for the higher pressure resulting from the fact that the filter is located upstream of the flow control means and is therefore under a relatively high pressure which may be as high as 25 bar. Furthermore, the casing of the filter will be dimensioned so as also to allow for the fatigue stresses arising from cyclic operation, the casing being pressurized and depressurized in approx. 12 to 15 minute cycles, i.e. typically 4 to 5 times per hour, over many years of service. Furthermore, the filter surface of the bag filter will be determined to permit a volumetric flow rate through the bags of the order of 2 to 60 m$^3$/minute.

The bag filter 11 is attached directly to the top of the hopper 3, such that the dust or powder material retained by the filter can return directly into the hopper. A depressurizing duct 12 is connected to the scrubbed gas outlet 13 of the filter. An isolation valve 14 is mounted on said duct, downstream of the filter, to permit closure of the hopper during pressurization thereof for conventional use thereof during pneumatic transport of powdered coal towards the tuyeres or injection point on the blast furnace. A de Laval nozzle 15 is provided on the depressurizing duct 12, downstream in the case of FIG. 2a, or upstream in the case of the FIG. 2b, of the isolation valve 14. The dimensional characteristics of the de Laval nozzle 15 are determined on the basis of the nominal flow rate of the bag filter, i.e. the maximum admissible flow rate through the filter bags, in order to ensure a constant volumetric flow rate through the tuyere which is substantially equal to or slightly less than said nominal flow rate of the filter.

The outlet of the de Laval nozzle may open directly into the atmosphere, if necessary via a silencer, or be connected to an installation for recycling the filtered gases.

Furthermore, it will be noted that, when filling the dispensing hopper, the valve 14 will be open for discharging the gases present in the dispensing hopper. This is incidentally the reason for which the pressure-equalizing ducts are no longer necessary.

Thanks to the invention, it has thus been possible to replace an atmospheric filter having an effective surface area of 75 m$^2$ with equivalent filters of just 10 m$^2$, while slightly increasing the loading of the filter surface.

The invention is not restricted to the embodiment and to the specific application relating to injecting coal into a blast furnace. It may also be applied to other installations comprising pressurized hoppers containing powder materials and requiring periodic depressurization of said hoppers through bag filters.

The invention claimed is:

1. An installation for distribution of granular or powder material via pneumatic transport comprising at least one dispensing hopper for temporary storage of said granular or powder material, the dispensing hopper being suited to being, alternately, pressurized for emptying the dispensing hopper and depressurized to permit filling thereof, and a device for depressurizing said dispensing hopper, comprising
 a depressurizing duct connected to said dispensing hopper,
 a bag filter, having a maximum operating flow rate of a gas flow, connected to said depressurizing duct, and
 flow control means for controlling the flow rate in said depressurizing duct through the bag filter,
wherein the bag filter is a filter suited to operating under pressure, and the flow control means are static control means without moving elements, disposed in the depressurizing duct downstream of the bag filter and configured to receive the gas flow, the flow control means comprising a plate with an orifice of predetermined cross-section or a de Laval nozzle of a predetermined cross-section and shape, arranged to permit the passage of a maximum volumetric flow rate which is less than or equal to the maximum admissible flow rate for the bag filter.

2. An installation according to claim 1, wherein the flow control means is disposed in the depressurizing duct downstream of an isolation valve disposed in the depressurizing duct.

3. An installation according to claim 1, wherein the flow control means is disposed in the depressurizing duct upstream of an isolation valve disposed in the depressurizing duct.

4. An installation according to claim 1, wherein it comprises a main storage hopper and a plurality of dispensing hoppers connected to the main storage hopper in order to be filled periodically with granular or powder material via pneumatic transport from the main hopper, and each dispensing hopper comprises its own depressurizing device, with a pressurized bag filter mounted directly on each dispensing hopper.

5. An installation according to claim 1, wherein the bag filter is configured for operation at a pressure of the gas flow up to 25 bar.

6. An installation according to claim 1, wherein said bag filter comprises a filter surface, and wherein the filter surface provides a predetermined volumetric flow rate of 2 to 60 m$^3$/minute.

7. An installation for distribution of granular or powder material via pneumatic transport comprising at least one dispensing hopper for temporary storage of said granular or powder material, the dispensing hopper being suited to being, alternately, pressurized for emptying the dispensing hopper and depressurized to permit filling thereof, and a device for depressurizing said dispensing hopper, comprising
 a first depressurizing duct connected to said dispensing hopper,
 a bag filter, having a maximum operating flow rate of a gas flow from the dispensing hopper, connected to said first depressurizing duct,
 a second depressurizing duct extending from said bag filter, said second depressurizing duct configured to receive a dedusted gas flow from said bag filter; and
 flow control means for controlling the flow rate through the bag filter,
 wherein the bag filter is a filter suited to operating under pressure, and the flow control means are static control means without moving elements, disposed in the second depressurizing duct downstream of the bag filter and configured to receive the dedusted gas flow, the flow control means comprising a plate with an orifice of predetermined cross-section or a de Laval nozzle of a predetermined cross-section and shape, arranged to permit the passage of a maximum volumetric flow rate which is less than or equal to the maximum admissible flow rate for the bag filter.

8. An installation according to claim 7, wherein the flow control means is disposed in the second depressurizing duct downstream of an isolation valve disposed in the depressurizing duct.

9. An installation according to claim 7, wherein the flow control means is disposed in the second depressurizing duct upstream of an isolation valve disposed in the depressurizing duct.

10. An installation according to claim 7, wherein the installation further comprises a main storage hopper and a plurality of the dispensing hoppers connected to the main storage hopper in order to be filled periodically with granular or powder material via pneumatic transport from the main hopper, and each dispensing hopper comprises its own depressurizing device, with a pressurized bag filter mounted directly on each dispensing hopper.

11. An installation according to claim 7, wherein the bag filter is configured for operation at a pressure of the gas flow up to 25 bar.

12. An installation according to claim 7, wherein said bag filter comprises a filter surface, and wherein the filter surface provides a predetermined volumetric flow rate of 2 to 60 m$^3$/minute.

13. A blast furnace installation structured for injecting granular or powder material into the blast furnace comprising at least one dispensing hopper structured for temporary storage of said granular or powder material, the dispensing hopper being configured to pressurize and to depressurize alternatively, and a device structured for depressurizing said dispensing hopper, comprising a depressurizing duct connected to said dispensing hopper, a bag filter, having a maximum operating flow rate of a gas flow, connected to said depressurizing duct, and flow control means for controlling the flow rate in said depressurizing duct through the bag filter, wherein the bag filter is structured to operate at a pressure up to 25 bar, and the flow control means are static control means without moving elements, are disposed in the depressurizing duct downstream of the bag filter, and are configured to receive the gas flow, and wherein the flow control means comprise a plate with an orifice of predetermined cross-section or a de Laval nozzle of a predetermined cross-section and shape, arranged to permit the passage of a maximum volumetric flow rate which is less than or equal to the maximum admissible flow rate for the bag filter.

\* \* \* \* \*